United States Patent [19]

Koyama

[11] 4,354,203

[45] Oct. 12, 1982

[54] LENS CONTROL MECHANISM FOR TELEVISION CAMERA

[75] Inventor: Naoki Koyama, Tokyo, Japan

[73] Assignee: Canon Kabushiki Kaisha, Tokyo, Japan

[21] Appl. No.: 150,064

[22] Filed: May 15, 1980

[30] Foreign Application Priority Data

May 21, 1979 [JP] Japan .................................. 54-61518

[51] Int. Cl.³ .......................... H04N 5/26; G03B 3/00
[52] U.S. Cl. .................................... 358/227; 352/140;
354/25; 354/195
[58] Field of Search ............... 358/227, 228, 229, 230, 358/225; 354/195, 25; 352/140; 355/55, 56

[56] References Cited

U.S. PATENT DOCUMENTS 3,541,941 11/1970 Barr ..................................... 358/227
4,008,372 12/1977 Veno ................................... 358/227
4,236,794 12/1980 Gordon .............................. 358/227

Primary Examiner—Michael A. Masinick
Attorney, Agent, or Firm—Toren, McGeady & Stanger

[57] ABSTRACT

In a television camera, a connection shaft for connecting a zoom operation flexible shaft and a focusing flexible shaft is rotatably attached to a lens holding member and is downwardly projected therefrom, with an engagement mechanism being provided in the lens holding member so as to prevent the zoom and focus movements of the lens when the connection shaft is stored in the lens holding member. A joint mechanism eliminates the necessity for the flexible shaft to extend perpendicularly from the camera during operation.

4 Claims, 8 Drawing Figures

FIG.5
FIG.6
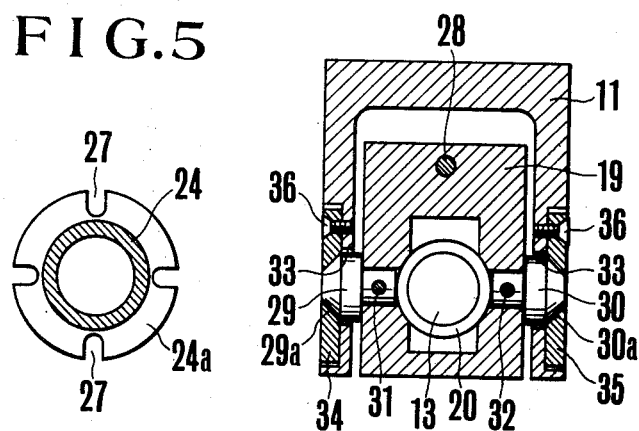
FIG.7
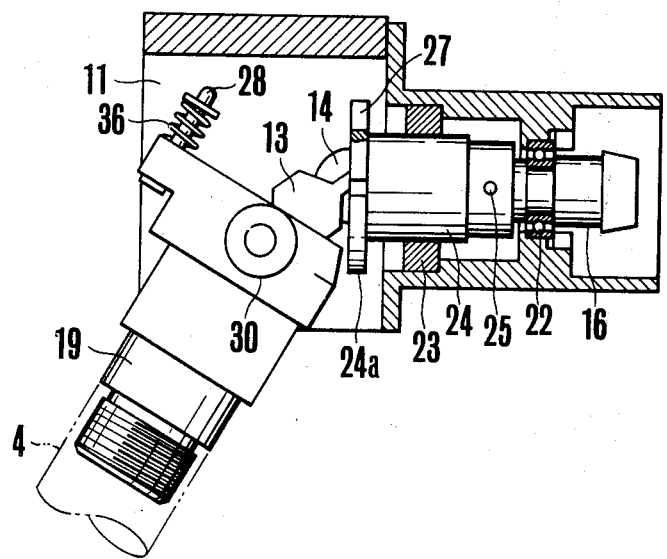

LENS CONTROL MECHANISM FOR TELEVISION CAMERA

BACKGROUND OF THE INVENTION

1. Field of the Invention:

The present invention relates to a television camera having a lens actuating device.

2. Description of Prior Art:

Recently, the zooming operation and focusing operation of a television camera lens have been performed by a servo control system, a push-pull control system and a flexible shaft control system which are required to enable wide variation in the applications of the lens.

The present invention relates particularly to a connection device for the flexible shaft in the flexible shaft control system.

Conventionally, as shown in FIGS. 1 and 2, the flexible shaft connection device is formed with a structure such that a cylindrical member 3 for attachment of a cover 2 for a flexible shaft 4 for driving the focusing shaft (not shown) is fixed to and projects from the lower side of a lens holding member 1, with a connection shaft 5 for connection with the flexible shaft 4 being rotatably mounted in the cylindrical member 3 by means of bearings 6, 6, and with a driving shaft 7 which is associated with the focus shaft of the lens being mounted in the lens holding member 1 by means of bearings 8, 8 in a direction transverse the connection shaft 5 so as to be linked with the shaft 5 by means of helical gears 9 and 10.

This conventional structure is disadvantageous in that because the connection shaft 5 projects downwardly from the lower side of the lens holding member, the cover 2 is sharply bent at the connection base 2a as shown in FIG. 3, so that the flexible shaft 4 contained therein is prohibited from smooth operation. Further, when the television camera is placed on a flat surface such as a table, the camera is unstable and the cover attachment 3 and the connection shaft 5 are often damaged.

In FIG. 3, a cover 200 for a flexible shaft for zoom operation is shown attached on the lower side of the lens holding member by means of a cover attachment 300. Therefore, it will be seen that the mechanism for zoom operation involves similar disadvantages as those arising in the mechanism for focusing operation.

Attempts have been made to enable the cover attachment 3 and the connection shaft 5 to project obliquely from the lens holding member 1, but such attempts have been unsuccessful because it is difficult to effect attachment and removal of the cover 2 and the flexible shaft 4. It was found, with prior art devices, that when the cover attachment 3 and the connection shaft 5 are not projected perpendicularly, the flexible shaft 4 cannot be smoothly operated because the attaching position and angle of the cover attachment 3 and the connection shaft 5 are fixedly mounted in their axial direction.

SUMMARY OF THE INVENTION

Therefore, the object of the present invention is to provide a flexible shaft connection device in which the mounting and removal of the flexible shaft can be easily performed, and wherein the connecting shaft can be contained in the lens holding member when it is not used, with the normal operative movement of the lens being prevented.

For achieving the above object, a connecting shaft for connecting a zoom-operation flexible shaft and a focus operation flexible shaft is rotatably attached to a lens holding member for a television camera to project obliquely downwardly therefrom, and an engagement mechanism is provided in the lens holding member so as to prevent the normal movement of the zoom and focus of the lens, while the connecting shaft is contained in the lens holding member when not in use.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 5 and FIG. 6 are respectively a cross sectional views along the line V—V and along the line VI—VI in FIG. 4.

FIG. 7 shows a cross sectional view of the connecting device according to the present invention.

DESCRIPTION OF PREFERRED EMBODIMENT

Figure 1:
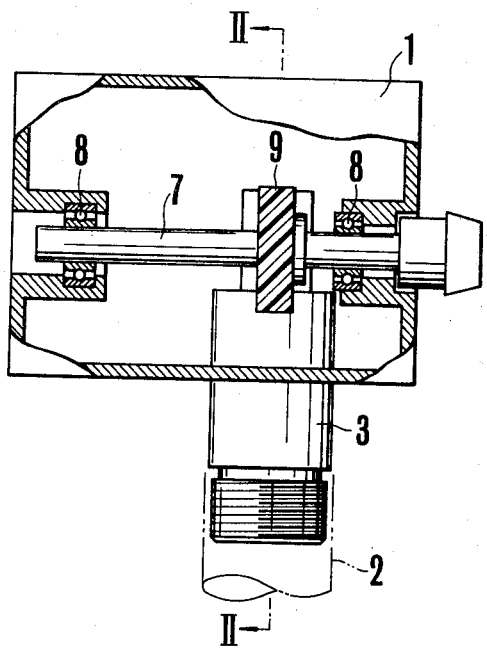
FIG. 1 shows a partial cross-sectional front view of a conventional flexible shaft connecting device.
Figure 2:
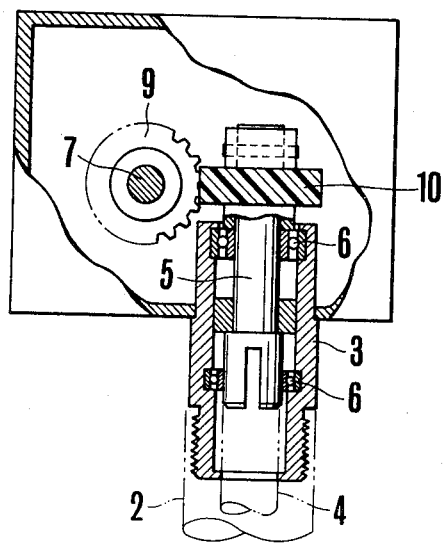
FIG. 2 is a cross sectional view of the device in FIG. 1 taken along the line II—II.
Figure 3:
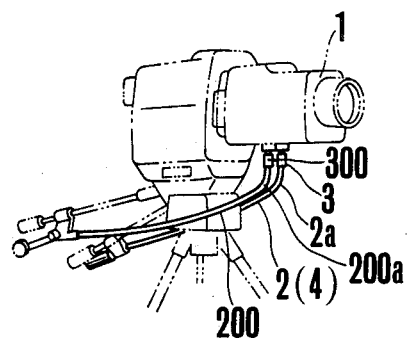
FIG. 3 is a schematic perspective view of a television camera equipped with the device shown in FIG. 1.
Figure 4:
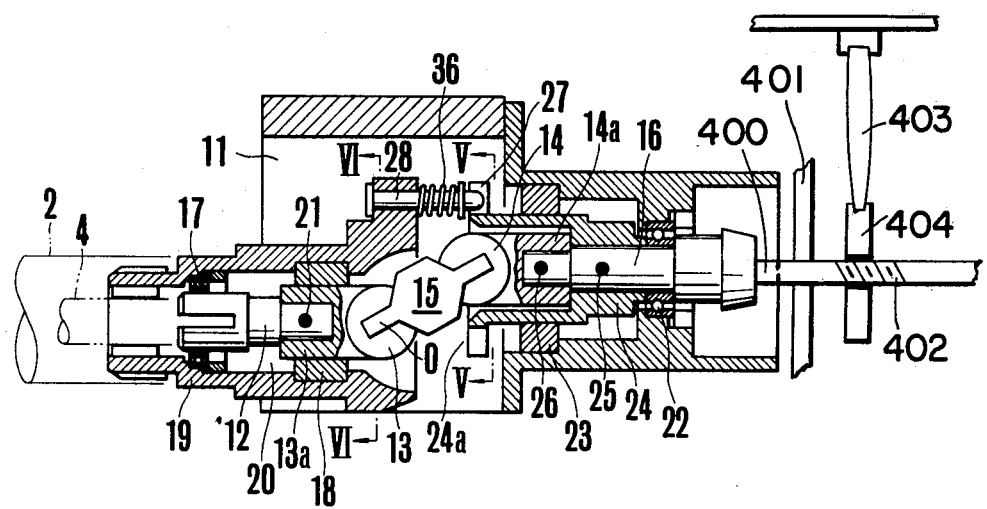
FIG. 4 is a cross sectional front view of the connecting device of the present invention.

In FIG. 4 the device according to the present invention is shown comprising a lens holding member 11 having therein a connecting shaft 12 for connection with the flexible shaft 4, a joint member 15 having two swing joints 13, 14, and a driving shaft 16 linked with the focus shaft (not shown).

The connecting shaft 12 is supported in the bore 20 of the attachment 19 for the flexible-shaft cover 2 by means of a radial bearing 17 and the sleeve 18, and at one end of the connecting shaft 12, the shaft 13a of the swing joint 13 of the joint member 15 is attached by a pin 21. The driving shaft 16 is supported in the lens holding member 11 by means of a radial bearing 22 and a sleeve 23 and a stopper 24, the shaft 14a of the other swing joint 14 of the joint member being attached to the driving shaft 16 by means of a pin 25 and a pin 26.

A focusing shaft 400 connected with the driving shaft 16 is rotatably supported on a lens barrel member 401. The shaft 400 includes a threaded portion 402 engaging a threaded portion in a fitting 404 which supports a lens 403 which is thereby movable along an optical axis by rotation of the shaft 400.

As shown in FIG. 5, a plurality of engagement recesses 27 are formed on the circumferential surface of the flange portion 24a of the stopper 24, and a pin 28 which engages with the recesses 27 is provided on the cover attachment 19.

Aligned with the rotation center O of the swing joint 13, there are provided rotation shafts 29, 30 which project from the cover attachment 19 and are fixed to the cover attachment 19 by means of pins 31 and 32.

These rotation shafts 29 and 30 are fitted into the bores 33 of the lens holding member 11 as shown in FIG. 6 and stopper plates 34 and 35 are fitted to the tapered faces 29a and 30a of the rotation shafts 29 and 30. These stopper plates 34 and 35 are fixedly fastened to the lens holding member 11 by means of the screws 36. Thus, the cover attachment 19 is rotatably supported by the lens holding member 11 and it can be stopped at a desired rotation position by a friction force of the stopper plates 34 and 35 applied upon the tapered faces 29a and 30a.

Figure 8:
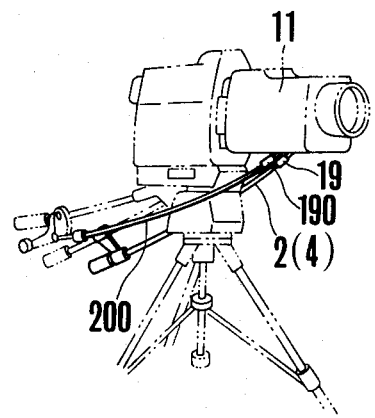
FIG. 8 is a schematic perspective view showing a television camera equipped with the device shown in FIG. 7.

With the structure as described hereinabove, the flexible shaft 4 can be easily and rapidly attached by rotating the cover attachment 19 around the shafts 29, 30 so that it will extend obliquely downward from the lens holding member 11 as shown in FIG. 8.

In this way, the attachment base of the cover 2 is aligned so that the rotation force of the flexible shaft 4 is smoothly transferred to the driving shaft 16 through the connection shaft 12 and the joint member 15. At this time, since the engagement pin 28 is out of engagement with the recess 27, the driving shaft 16 is freely rotated to drive the focus shaft.

When the television camera is not used, the cover 2 and the flexible shaft 4 are removed from the cover attachment 19 and the connecting shaft 12, and the cover attachment 19 can be stored in the lens holding member 11 as shown in FIG. 4. Therefore, the television camera is stabilized when it is placed on a flat surface and there is no danger of damaging the cover attachment 19 and the connection member 12. Further, at the time of containing the cover attachment 19, the pin 28 strikes the surface of the flange portion 24a and retreats against the force of the positions of the spring 36 so long as the pin 28 and the recess 27 do not coincide, whereby the storing operation is not hindered. Under this condition, when the driving shaft 16 is slightly rotated so as to position the pin in coincidence with the recess 27, the pin 28 is pushed out by the elasticity of the spring 36 and engages with the recess 27. In order to facilitate the engagement of the pin 28 with the recess, it is preferable to provide the recess 27 on the circumferential surface of the flange 24 in a form similar to that of a gear.

By the engagement of the pin 28 with the recess 27, the rotation of the driving shaft is prevented so that it is possible to securely prevent focusing movement of the lens. According to a conventional device, a separate member is attached to the connection shaft in order to prevent this movement, but such a structure has a disadvantage in that the separate member must project outwardly of the lens holding member, or the separate member will be lost. The present invention has completely eliminated such disadvantages.

While a specific embodiment of the invention has been shown and described in detail to illustrate the application of the inventive principles, it will be understood that the invention may be embodied otherwise without departing from such principles.

What is claimed is:

1. A television camera comprising
   a lens having a movable lens member;
   means for moving said movable lens member;
   a rotatable flexible shaft;
   a rotatable connection mechanism having one end connected with said flexible shaft and another end connected to said moving means, said rotatable connection mechanism transferring rotative motion of said rotatable flexible shaft to said means for moving said movable lens member so as to effect movement thereof, said connection mechanism having a rotation position for storage and a rotation position for operation; and
   stop means for rendering said moving means inoperative when said connection mechanism is at said rotation position for storage.

2. A lens control mechanism for a television camera having a lens mechanism including a movable lens member comprising flexible shaft means operable to effect control of said movable lens member, joint means connecting said flexible shaft means and said movable lens member to enable said movable lens member to be controlled by rotation of said flexible shaft means while permitting said flexible shaft means to be simultaneously pivoted relative to said camera, and pivot means pivotally mounting said flexible shaft means relative to said camera to permit said flexible shaft means to be operatively controlled while extending obliquely relative to said camera.

3. A mechanism according to claim 2 wherein said flexible shaft means include an attachment member for enabling connection and disconnection of a flexible shaft and wherein said attachment member may be pivoted about said pivot means to a storage position when said camera is not in use, said control mechanism further including releasable locking means rendering said flexible shaft means inoperative to effect actuation of said lens mechanism when said camera is not in use.

4. A mechanism according to claim 3 wherein said releasable locking means comprise a spring loaded pin member and a recessed plate member operative to be placed in locking engagement with each other when said flexible shaft means is in said storage position, with one of said pin member and said plate member being mounted for pivotal movement together with said flexible shaft means about said pivot means.

* * * * *